(12) United States Patent  (10) Patent No.: US 8,822,937 B2
Koyanagi  (45) Date of Patent: Sep. 2, 2014

(54) RADIOGRAPHIC IMAGING APPARATUS

(75) Inventor: Takahiro Koyanagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 13/508,858

(22) PCT Filed: Nov. 24, 2010

(86) PCT No.: PCT/JP2010/006848
§ 371 (c)(1),
(2), (4) Date: May 9, 2012

(87) PCT Pub. No.: WO2011/064989
PCT Pub. Date: Jun. 3, 2011

(65) Prior Publication Data
US 2012/0228499 A1  Sep. 13, 2012

(30) Foreign Application Priority Data

Nov. 27, 2009 (JP) .................................. 2009-270096

(51) Int. Cl.
G03B 42/04 (2006.01)
(52) U.S. Cl.
CPC ..................................... *G03B 42/04* (2013.01)
USPC .............. 250/370.08; 250/336.1; 250/370.09; 250/370.11
(58) Field of Classification Search
USPC ................ 250/370.08, 370.09, 370.11, 336.1
See application file for complete search history.

(56) References Cited

U.S. PATENT DOCUMENTS

| 7,203,549 B2 * | 4/2007 | Schommer et al. .............. 607/60 |
| 7,482,595 B1 | 1/2009 | Ertel |
| 2007/0272873 A1 * | 11/2007 | Jadrich et al. ............ 250/370.11 |
| 2009/0026376 A1 | 1/2009 | Kuwabara et al. |

FOREIGN PATENT DOCUMENTS

| CN | 101366635 A | 2/2009 |
| JP | 2003210444 A | 7/2003 |
| JP | 3990914 B2 | 10/2007 |
| WO | 2009054231 A1 | 4/2009 |

* cited by examiner

*Primary Examiner* — David Porta
*Assistant Examiner* — Adam J Fifth
(74) *Attorney, Agent, or Firm* — Canon USA Inc. IP Division

(57) ABSTRACT

A radiographic imaging apparatus includes a radiographic-image detecting unit configured to detect radiation and convert the detected radiation to an image signal; a wireless transmission unit configured to wirelessly transmit the image signal to an external device; and a housing configured to cover the radiographic-image detecting unit and the wireless transmission unit, wherein a first side surface of the housing has a first opening for wireless transmission performed by the wireless transmission unit, and a second side surface of the housing adjoining the first side surface has a second opening for wireless transmission by the wireless transmission unit.

18 Claims, 5 Drawing Sheets

RADIOGRAPHIC IMAGING APPARATUS

TECHNICAL FIELD

The present invention relates to a radiographic imaging apparatus that detects radiation and acquires a radiographic image.

BACKGROUND ART

Radiographic imaging apparatuses using flat panel sensors formed of thin-film semi-conductor material on insulating substrates are being put to practical use as imaging apparatuses for medical image diagnosis and nondestructive testing by radiation. A radiographic imaging apparatuses using a flat panel sensor converts radiation that has been transmitted through a subject to be tested to an analog electrical signal at the flat panel sensor and acquires a digital image signal by carrying out analog-to-digital conversion. In medical image diagnosis, a digital radiographic imaging apparatus is used for picking up still images and moving images, such as fluoroscopic images.

Today, many digital radiographic imaging apparatuses are commercially produced as portable radiographic imaging apparatuses that are thin and lightweight. As a digital radiographic imaging apparatus according to the related art, a wireless radiographic imaging apparatus that wirelessly transmits and receives data to and from an external device to improve portability is disclosed in PTL 1.

In general, the housing of a digital radiographic imaging apparatus is a metal housing or a molded housing covered with an electromagnetic shield. In this way, the stiffness of the radiographic imaging apparatus is maintained, and the electronic circuits inside the radiographic imaging apparatus are protected from external electromagnetic noise. A decrease in image quality of the radiographic images will have an adverse effect on healthcare. Therefore, such a decrease in image quality of the radiographic images due to electromagnetic noise must be prevented.

Unfortunately, when a wireless communication unit, such as an antenna, is disposed inside the housing, it is difficult to perform satisfactory wireless communication because the housing blocks external electromagnetic waves. Therefore, an opening is formed in the housing near the wireless communication unit to ensure satisfactory wireless communication. A large opening will ensure satisfactory wireless communication. However, the large opening will cause a reduction in the stiffness of the radiographic imaging apparatus.

CITATION LIST

Patent Literature

PTL 1: Japanese Patent No. 03990914

SUMMARY OF INVENTION

The present invention has been made in consideration of the above situations and provides a radiographic imaging apparatus that ensures optimal wireless communication while maintaining the stiffness of the radiographic imaging apparatus.

The present invention provides a radiographic imaging apparatus including a radiographic-image detecting unit configured to detect radiation and convert the detected radiation to an image signal; a wireless transmission unit configured to wirelessly transmit the image signal to an external device; and a housing configured to cover the radiographic-image detecting unit and the wireless transmission unit, wherein a first side surface of the housing has a first opening for wireless transmission performed by the wireless transmission unit, and a second side surface of the housing adjoining the first side surface has a second opening for wireless transmission by the wireless transmission unit.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Preferred embodiments of the present invention will be described in detail in accordance with the accompanying drawings.

First Embodiment

FIGS. 1 and 2A to 2E illustrate the configuration of a radiographic imaging apparatus according to this embodiment. The radiographic imaging apparatus according to this embodiment will be described with reference to FIGS. 1 and 2A to 2E.

Figure 1:
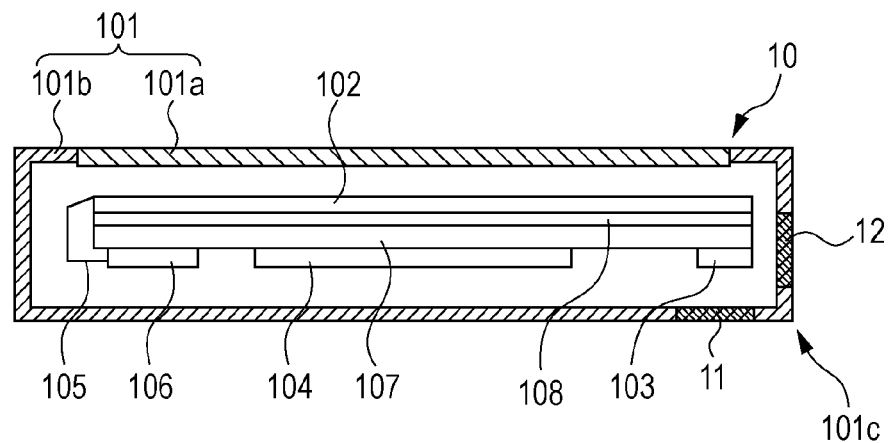
FIG. 1 is a sectional side view of an electronic cassette according to a first embodiment.

FIG. 1 is a sectional side view of an electronic cassette according to this embodiment. As illustrated in FIG. 1, the electronic cassette according to this embodiment is shaped as a cuboid.

A housing 101 of an electronic cassette 10 includes a stiff metal housing part 101b and a radiation incident surface formed of a high radiation-transmittance material 101a.

The housing 101 accommodates a radiographic image sensor 102 that functions as a radiographic image detecting unit detecting radiation and converting the detected radiation to an image signal. A sensor retaining plate 107 is attached to the radiographic image sensor 102 on the surface opposite to the radiation incident surface of the radiographic image sensor 102. The sensor retaining plate 107 and the radiographic image sensor 102 are joined together with a radiation shielding plate 108 interposed therebetween so as to protect electric substrates, including a control circuit portion 104, and prevent image degradation due to backscattering.

In the radiographic image sensor 102, a plurality of pixels, each having a converter element converting the radiation to a charge corresponding to the radiation and a switching element transferring an electrical signal based on the charge, are arranged two-dimensionally. The radiographic image sensor 102 is connected to a readout circuit portion 106 that reads out electrical signals from the pixels via a flexible circuit board 105.

The readout circuit portion 106 and the control circuit portion 104 that controls electrical signals are connected via a cable (not shown).

A wireless transmission and reception antenna 103 functions as a wireless receiving unit and a wireless transmitting unit transmitting image signals to and from external devices. Instead of the wireless transmission and reception antenna 103, a wireless transmission antenna mainly for transmitting image signals may be used.

The wireless transmission and reception antenna 103 is connected to the control circuit portion 104 via a cable (not shown).

Since a metal housing is used in this embodiment as described above, when the antenna radiating property is taken into consideration, it is desirable that the wireless transmission and reception antenna 103 be a protrusion on the housing 101 that is covered with a non-conductive cover.

However, with such a configuration, it is difficult to maintain the stiffness of the electronic cassette 10 having an external size substantially the same as a film cassette. Thus, in this embodiment, the wireless transmission and reception antenna 103 is disposed on the side opposite to the side on which the radiation incident surface of the radiographic image sensor 102 is disposed. In this way, size of the electronic cassette 10 becomes substantially the same as that of a film cassette.

Additionally, for an optimal antenna radiating property, antenna covers 11 and 12 (first non-conductive member and second non-conductive member) including non-conductive members are disposed on adjoining surfaces of the housing 101 near the wireless transmission and reception antenna 103. The antenna covers 11 and 12 of the housing 101 are installed in openings, each having a length larger than one half of wavelength 1 of the antenna frequency F.

For example, when the wireless transmission and reception antenna 103 is a multiband antenna, openings each having a length larger than one half of the longest wavelength should be formed.

As described above, optimal wireless transmission is achieved by forming a first opening in a first side surface of the housing 101 and forming a second opening in a second side surface adjoining the first side surface.

In this embodiment, the stiffness of the housing 101 is maintained by forming the antenna openings such that an edge section 101c shared by two surfaces of the housing 101 is left.

With such a configuration, the radiating property of the antenna and the stiffness of the housing 101 are ensured, and the size of the device (the size compatible with the size of the cassette).

The antenna covers 11 and 12 are light-shielding members and prevent the radiographic image sensor 102 from being exposed to external light.

FIGS. 2A to 2E illustrate example arrangements of the antenna covers of this embodiment.

Figure 2A:
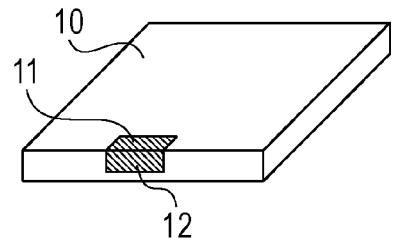
FIG. 2A illustrates a schematic arrangement of antenna covers according to the first embodiment.

In FIG. 2A, the antenna covers 11 and 12 are disposed on a side surface of the electronic cassette 10 and the surface opposing the radiation incident surface. The antenna covers 11 and 12 are provided as an integrated structure such that the antenna covers 11 and 12 can be removed from the electronic cassette 10 together with the edge section 101 as one piece. By provided the antenna covers as an integrated structure, the number of components can be reduced.

Figure 2B:
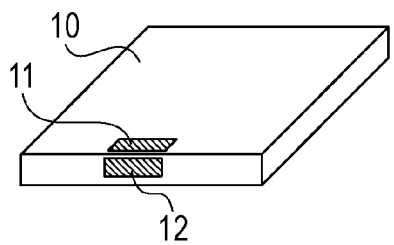
FIG. 2B illustrates a schematic arrangement of antenna covers according to the first embodiment.

In FIG. 2B, antenna covers 11 and 12 are disposed separately on a side surface of the electronic cassette 10 and the surface opposing the radiation incident surface. Compared with the arrangement in FIG. 2A, stiffness is increased, and the size can be decreased (especially, the thickness of the housing and frame can be reduced).

Figure 2C:
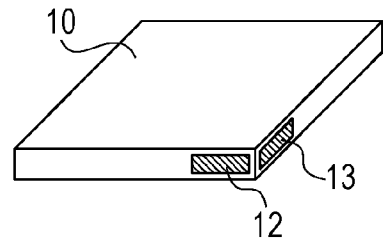
FIG. 2C illustrates a schematic arrangement of antenna covers according to the first embodiment.

In FIG. 2C, antenna covers 12 and 13 are disposed separately on two adjoining side surfaces near a corner of the electronic cassette 10. Compared with the arrangement in FIG. 2B, the stiffness of the corner sections is lowered but an optimal antenna radiating property can be acquired when, for example, a metal structure is installed behind the electronic cassette 10.

Figure 2D:
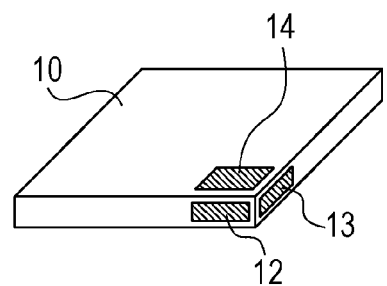
FIG. 2D illustrates a schematic arrangement of antenna covers according to the first embodiment.

In FIG. 2D, antenna covers 12, 13, and 14 are disposed separately on two adjoining side surfaces and on the surface opposing the radiation incident surface near a corner of the electronic cassette 10. Compared with the other example arrangements, the stiffness is lowered and the size is large (in particular, the frame is thick) but the antenna radiating property is optimal, providing a structure effective in environments with unsatisfactory wireless communication conditions.

Figure 2E:
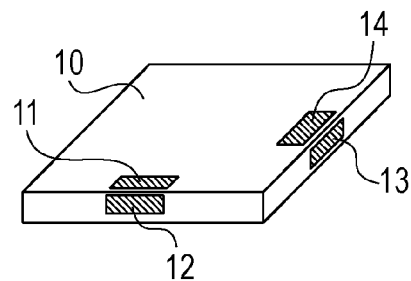
FIG. 2E illustrates a schematic arrangement of antenna covers according to the first embodiment.

In FIG. 2E, antenna covers 11 and 12 are disposed on a side surface of the electronic cassette 10 and the surface opposing the radiation incident surface. In addition, an antenna cover 13 is disposed on another side surface on which the antenna cover 12 is not disposed, and an antenna 14 is provided on the surface opposing the radiation incident surface. Compared with the other example arrangements, the antenna property is improved even more by providing two antennas, each of which has the same structure as the antenna illustrated in FIG. 2B. Any of the arrangements in FIGS. 2A, 2B, and 2C can be combined; for example, the arrangements in FIGS. 2B and 2C may be combined.

Although the width of the edge sections of the housing differ depending on the arrangement, when there is no restrictions on the external size of the housing, the width of the edge sections are set to a value that ensures resistance against impacts, such as drops.

Separate antenna covers, such as those illustrated in FIG. 2B, are also provided in the arrangements illustrated in FIGS. 2C, 2D, and 2E. The antenna cover parts may instead be integrated such as those illustrated in FIG. 2A.

Second Embodiment

Figure 3:
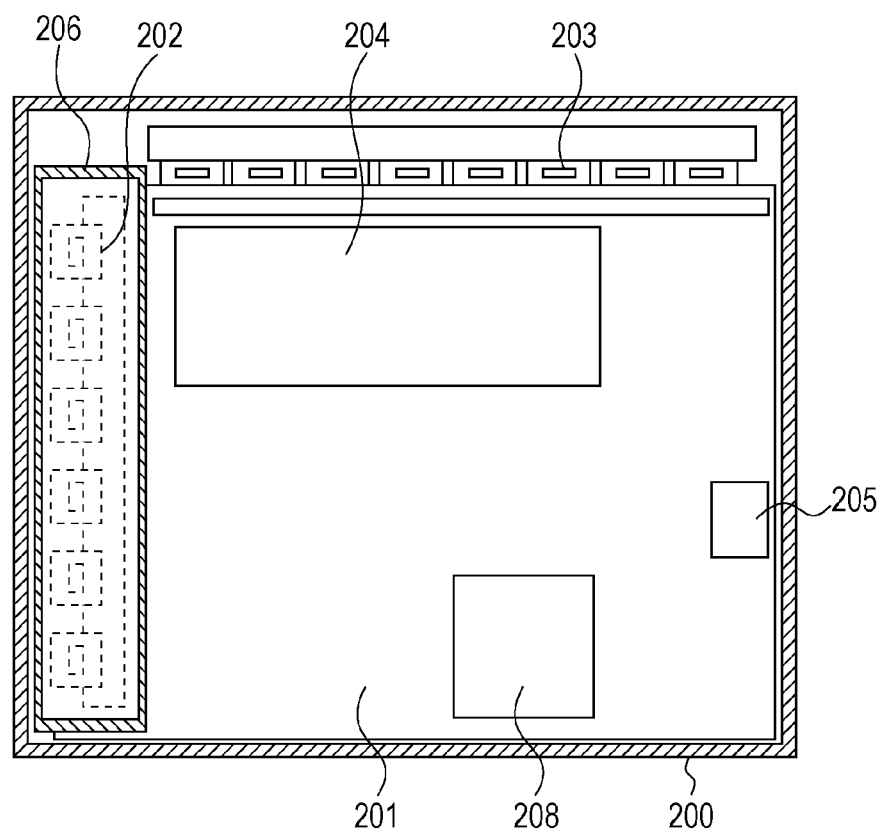
FIG. 3 is a sectional top view of an electronic cassette according to a second embodiment.
Figure 4:
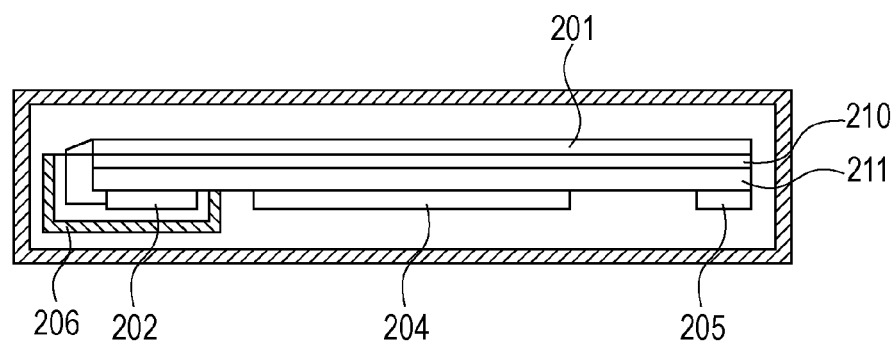
FIG. 4 is a sectional side view of the electronic cassette according to the second embodiment.

FIGS. 3 and 4 illustrate the internal structure of a radiographic imaging apparatus according to this embodiment. The radiographic imaging apparatus according to this embodiment will be described with reference to FIGS. 3 and 4.

FIG. 3 is a sectional top view from the back side of the radiation incident surface of an electronic cassette 200 according to this embodiment. FIG. 4 is a sectional side view of the electronic cassette 200 according to this embodiment.

The housing of the electronic cassette 200 accompanies a radiographic image sensor 201 and a sensor retaining plate 211, which are joined together with a radiation-shielding and noise-shielding metal shielding plate 210 interposed therebetween. In the radiographic image sensor 201, a plurality of pixels, each having a converter element converting radiation to a charge corresponding to the radiation and a switching element transferring an electrical signal based on the charge, are arranged two-dimensionally. A driving circuit portion 203 outputs a driving signal having a voltage that makes the switching element conductive to the switching element via a flexible circuit board. The driving circuit portion 203 and a readout circuit portion 202 that reads out electrical signals from the pixels are respectively connected to a first side and a second side different from the first side of the radiographic image sensor 201. The readout circuit portion 202 is covered with a metal shield portion 206 that prevents a reduction in image quality due to noise. The readout circuit portion 202 and a control circuit portion 204 that controls the electrical signal are connected via a cable (not shown).

A wireless communication unit 205 is disposed near a side opposing the readout circuit portion 202 so that the radiating property is not degraded and/or the resonant frequency is not changed due to the influence of surrounding conductive members. The periphery is covered with a non-conductive material (not shown). The influence of noise can be reduced by disposing the wireless communication unit 205 on the surface opposite to the radiation incident surface of the radiographic image sensor 201 with the radiation-shielding and noise shielding metal shielding plate 210.

The radiographic imaging apparatus according to this embodiment also includes a power source 208 supplying power to the radiographic image sensor 201 and the circuit boards. The power source 208, together with the wireless communication unit 205, enables wireless communication.

To reduce the size of the electronic cassette, all components are disposed on the surface opposing the radiation incident surface of the radiographic image sensor 201. For example, with an apparatus that does not require a size reduction may have the components disposed on a surface not opposing the radiation incident surface of the radiographic image sensor 201.

Third Embodiment

According to the third embodiment, an electronic cassette accommodates a double-scanning radiation sensor having two readout circuit portions, which enable high-speed readout and are disposed at two opposing sides. In such a case, a wireless communication unit cannot be disposed at a side opposing the readout circuit portion. By taking into consideration such a point, the electronic cassette having a double-scanning radiation sensor according to this embodiment will be described with reference to FIG. 5.

Figure 5:
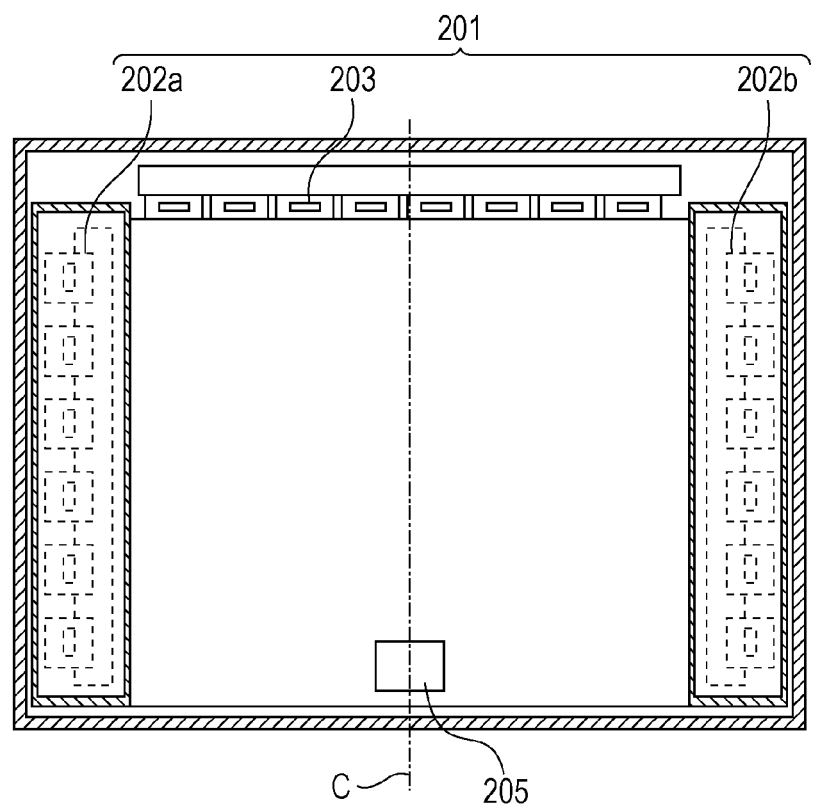
FIG. 5 is a sectional top view of an electronic cassette according to a third embodiment.

FIG. 5 is a sectional top view from the back side of the radiation incident surface of the electronic cassette according to this embodiment. Readout circuit portions 202a and 202b that readout electrical signals from pixels are connected to opposing sides of a radiographic image sensor 201. A driving circuit portion 203 is connected to a third side. By disposing a wireless communication unit 205 at the center C of the remaining side (fourth side) to which neither the readout circuit portions 202a and 202b nor the driving circuit portion 203 is connected, the influence of noise and the external size can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-270096, filed Nov. 27, 2009, which is hereby incorporated by reference herein in its entirety.

The invention claimed is:

1. A radiographic imaging apparatus comprising:
    a radiographic-image detecting unit configured to detect radiation and convert the detected radiation to an image signal;
    a wireless transmission unit including a wireless antenna and being configured to wirelessly transmit the image signal to an external device; and
    a housing configured to cover the radiographic-image detecting unit and the wireless transmission unit,
    wherein a first side surface of the housing has a first opening for wireless transmission from the wireless transmission unit, and a second side surface of the housing adjoining the first side surface has a second opening for wireless transmission from the wireless transmission unit,
    wherein the wireless transmission unit is disposed inside an inner space surrounded by an outer wall of the housing, and
    wherein a portion of the outer wall of the housing between the first opening and the second opening forms a support portion of the housing.

2. The radiographic imaging apparatus according to claim 1, wherein a first non-conductive member is disposed in the first opening, and a second non-conductive member is disposed in the second opening.

3. The radiographic imaging apparatus according to claim 2, wherein the first non-conductive member and the second non-conductive member are configured to block light from entering into the inner space of the housing.

4. The radiographic imaging apparatus according to claim 1, further comprising:
    a readout circuit disposed at a first side inside the radiographic imaging apparatus and configured to readout the image signal from the radiographic-image detecting unit,
    wherein the radiographic imaging apparatus is shaped as a cuboid, and
    wherein the wireless transmission unit including the wireless antenna is disposed at a second side different from the first side inside the radiographic imaging apparatus.

5. The radiographic imaging apparatus according to claim 4, wherein the wireless transmission unit including the wireless antenna is disposed at the center of the second side.

6. The radiographic imaging apparatus according to claim 1, further comprising:
    a shielding plate interposed between the radiographic-image detecting unit and the wireless transmission unit including the wireless antenna and configured to prevent an influence of noise.

7. The radiographic imaging apparatus according to claim 1,
    wherein each of the first and second openings has a dimension larger than one half of a wavelength of an antenna frequency of the wireless antenna.

8. The radiographic imaging apparatus according to claim 1, wherein the wireless transmission unit includes a multiband wireless antenna, and
    wherein each of the first and second openings has a dimension larger than one half of a longest wavelength among antenna frequencies of the multiband wireless antenna.

9. The radiographic imaging apparatus according to claim 1, wherein the housing further includes a third side surface substantially perpendicular to the first and second side surfaces, and wherein the third side surface includes one or more openings for wireless transmission from the wireless transmission unit.

10. The radiographic imaging apparatus according to claim 1, wherein the wireless antenna is disposed inside the inner space surrounded by the outer wall of the housing.

11. A radiographic imaging apparatus comprising:
a radiographic-image detecting unit configured to detect radiation and convert the detected radiation to an image signal;
a wireless transmission unit including a wireless antenna and being configured to wirelessly transmit the image signal to an external device; and
a housing configured to cover the radiographic-image detecting unit and the wireless transmission unit,
wherein a first side surface of the housing has a first opening for wireless transmission from the wireless transmission unit, and a second side surface of the housing adjoining the first side surface has a second opening for wireless transmission from the wireless transmission unit,
wherein the wireless transmission unit is disposed inside an inner space surrounded by an outer wall of the housing, and
an edge section of the outer wall of the housing between the first opening and the second opening is shared by the first side surface and the second side surface.

12. The radiographic imaging apparatus according to claim 11, wherein the wireless antenna is disposed inside the inner space surrounded by the outer wall of the housing.

13. A radiographic imaging apparatus comprising:
a radiographic-image detecting unit configured to detect radiation and convert the detected radiation to an image signal;
a wireless transmission unit including a wireless antenna and being configured to wirelessly transmit the image signal to an external device; and
a housing configured to cover the radiographic-image detecting unit and the wireless transmission unit, the housing including a first side surface and a second side surface and a third side surface substantially perpendicular to the first and second side surfaces,
wherein the housing includes two or more openings for wireless transmission from the wireless transmission unit,
wherein the first side surface, the second side surface and the third side surface form an outer wall of the housing such that the wireless transmission unit is disposed inside an inner space of the housing surrounded by the outer wall, wherein the two or more openings are formed separate from each other in at least one of the first side surface, the second side surface and the third side surface, and wherein the two or more openings are separated from each other by a portion of material of at least one of the first side surface, the second side surface and the third side surface.

14. The radiographic imaging apparatus according to claim 13, wherein the wireless antenna is disposed inside the inner space surrounded by the outer wall of the housing.

15. A radiographic imaging apparatus comprising:
a radiographic-image detecting unit configured to detect radiation and convert the detected radiation to an image signal;
a wireless communication unit including a wireless antenna and being configured to wirelessly communicate with an external device; and
a housing including a radiation-transmissive part configured to cover the radiographic-image detecting unit and a metallic part configured to cover the wireless communication unit,
wherein the metallic part of the housing includes a first side surface having a first opening and a second side surface having a second opening, the first opening and second opening being configured for allowing wireless communication between the wireless antenna and the external device,
wherein the wireless communication unit is disposed inside an inner space surrounded by an outer wall of the housing, and
wherein the first opening is separated from the second opening by a portion of metal material of at least one of the first side surface and the second side surface.

16. The radiographic imaging apparatus according to claim 15, wherein the first side surface and the second side surface form a metallic angular edge between the first opening and the second opening.

17. The radiographic imaging apparatus according to claim 15, wherein a first non-conductive member is disposed in the first opening, and a second non-conductive member is disposed in the second opening, and
wherein the first non-conductive member is bounded by metal material of the first side surface and the second non-conductive member is bounded by metal material of the second side surface.

18. The radiographic imaging apparatus according to claim 15, wherein the wireless antenna is disposed inside the inner space surrounded by the outer wall of the housing.

* * * * *